United States Patent
Tsai et al.

(10) Patent No.: US 7,372,217 B2
(45) Date of Patent: May 13, 2008

(54) DEVICE FOR DRIVING A LIGHT SOURCE MODULE

(75) Inventors: Cheng-Chueh Tsai, Shenzhen (CN); Yi-Hsun Lin, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,214

(22) Filed: Jul. 13, 2006

(65) Prior Publication Data

US 2007/0108919 A1    May 17, 2007

(30) Foreign Application Priority Data

Nov. 11, 2005   (TW)   .................................. 94139737

(51) Int. Cl.
*H05B 37/02*       (2006.01)
(52) U.S. Cl. .................. 315/308; 315/291; 315/307; 315/309
(58) Field of Classification Search ............ 315/209 R, 315/224–226, 246, 276, 291, 294–295, 297, 315/307–309, 312
See application file for complete search history.

(56) References Cited

U.S. PATENT DOCUMENTS

| | | | | |
|---|---|---|---|---|
| 5,463,287 A | | 10/1995 | Kurihara et al. ............ | 315/308 |
| 6,046,551 A | * | 4/2000 | Kita ............................ | 315/307 |
| 6,181,086 B1 | * | 1/2001 | Katyl et al. .................. | 315/307 |
| 7,098,605 B2 | * | 8/2006 | Oh .............................. | 315/291 |
| 2002/0175640 A1 | * | 11/2002 | Kim et al. ................... | 315/307 |
| 2005/0253537 A1 | * | 11/2005 | Jang et al. ................... | 315/307 |
| 2006/0001385 A1 | * | 1/2006 | Lee ............................. | 315/291 |
| 2006/0049959 A1 | * | 3/2006 | Sanchez .................. | 340/855.3 |
| 2006/0284574 A1 | * | 12/2006 | Emslie et al. ............... | 315/312 |
| 2007/0103093 A1 | * | 5/2007 | Hagen et al. ............... | 315/291 |

FOREIGN PATENT DOCUMENTS

JP         2004-355859         12/2004
TW             297209           2/1997

* cited by examiner

*Primary Examiner*—Thuy V. Tran
*Assistant Examiner*—Tung X Le
(74) *Attorney, Agent, or Firm*—Wei Te Chung

(57) ABSTRACT

A driving device for driving a light source module (22) includes an inverter circuit (21), a signal sensing circuit (23), a microcontroller (24), and a control circuit (25). The inverter circuit converts a received power signal to an alternating current (AC) signal. The signal sensing circuit is connected to the inverter circuit and the light source module, and generating protection signals of the driving device. The microcontroller receives the protection signals output from the signal sensing circuit, and outputs a logic control signal. The control circuit receives the logic control signal and controls the AC signal output from the inverter circuit according to the logic control signal.

9 Claims, 5 Drawing Sheets

DEVICE FOR DRIVING A LIGHT SOURCE MODULE

DESCRIPTION

1. Field of the Invention

The invention relates to electronic driving devices, and particularly to a device for driving a light source such as Cold Cathode Fluorescent Lamps (CCFLs) of a liquid crystal display (LCD) panel.

2. Description of Related Art

Conventionally, discharge lamps such as cold cathode fluorescent lights (CCFLs) have been used as light sources for liquid crystal display (LCD) panels, and must be driven by high voltages. In order to ensure the discharge lamps to operate normally, the driving device includes detection and protection circuits to detect whether the discharge lamps are operating normally.

Normally, a conventional driving device as in FIG. 5 has an analog protection circuit. The conventional discharge lamp driving device includes a power source 10, a power stage circuit 11, a transformer circuit 12, a lamp module 13, a feedback circuit 14, a voltage sensing circuit 15, a control circuit 16, a first reference circuit 17, a second reference circuit 18, and a compare circuit 19.

The power stage circuit 11 and the transformer circuit 12 convert a signal received from the power source 10 to an alternating current (AC) signal, and transmit the AC signal to the lamp module 13. The feedback circuit 14 and the voltage sensing circuit 15 respectively feed a current signal and a voltage signal of the lamp module 13 to the compare circuit 19. The first reference circuit 17 and the second reference circuit 18 respectively generate a first reference signal and a second reference signal to the compare circuit 19.

The first reference signal is a predetermined maximum allowable current signal of the lamp module 13, and the second reference signal is a predetermined maximum allowable voltage signal applied to the lamp module 13. The compare circuit 19 respectively compares the current signal to the first reference signal, and the voltage signal to the second reference signal, and then outputs a control signal to the control circuit 16. The control circuit 16 controls the AC signal output from the power stage circuit 11 according to the control signal.

Unfortunately, the reference signals of the conventional driving device using the analog protection circuit have low precision. In addition, different protection circuits correspond to different protective functions such that the conventional driving device requires many components resulting in a complicated structure.

SUMMARY OF THE INVENTION

An exemplary embodiment of the invention provides a driving device for driving a plurality of CCFLs. The driving device includes an inverter circuit, a signal sensing circuit, a microcontroller, and a control circuit. The inverter circuit converts a received power signal to an alternative current (AC) signal. The signal sensing circuit is connected to the inverter circuit and the CCFLs, and generates protection signals of the driving device. The microcontroller receives the protection signals output from the signal sensing circuit, and outputs a logic control signal. The control circuit receives the logic control signal and controls the AC signal output from the inverter circuit according to the logic control signal.

Other advantages and novel features will become more apparent from the following detailed description of preferred embodiments when taken in conjunction with the accompanying drawings, in which:

DETAILED DESCRIPTION OF THE INVENTION

Figure 1:
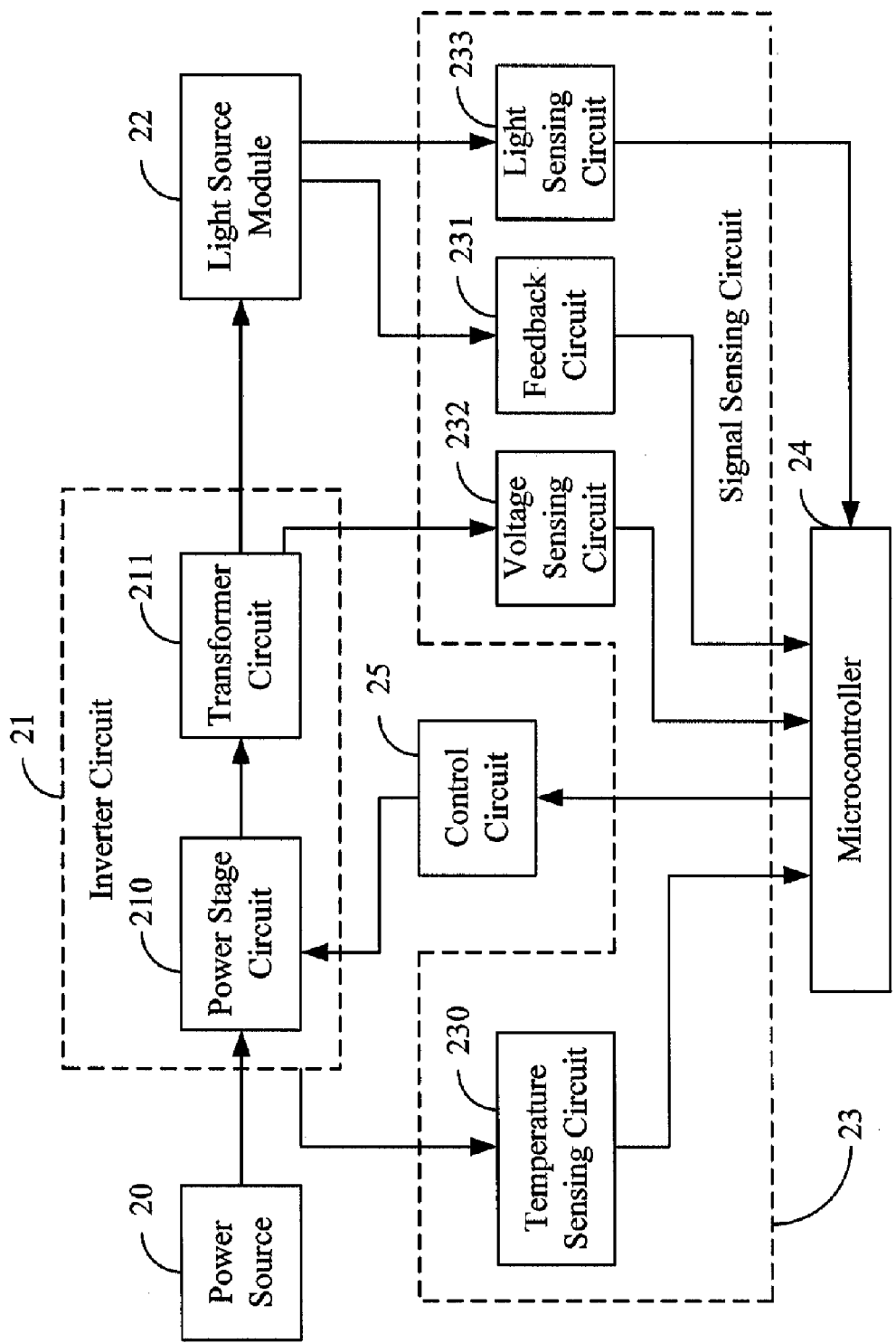
FIG. 1 is a block diagram of a driving device of a first exemplary embodiment of the present invention including a microcontroller.

FIG. 1 is a block diagram of a driving device for driving a light source module of a first exemplary embodiment of the present invention. The driving device includes a power source 20, an inverter circuit 21, a light source module 22, a signal sensing circuit 23, a microcontroller 24, and a control circuit 25. The light source module 22 includes a plurality of cold cathode fluorescent lamps (CCFLs).

The power source 20 provides a power signal to the inverter circuit 21. The inverter circuit 21 converts the power signal to an alternating current (AC) signal, and transmits the AC signal to the light source module 22.

The inverter circuit 21 includes a power stage circuit 210 and a transformer circuit 211. In the inverter circuit 21, the transformer circuit 211 converts a signal, output from the power stage circuit 210, to the AC signal.

The signal sensing circuit 23 is connected to and receives signals form the inverter circuit 21 and the light source module 22, and generates protection signals of the driving device. The microcontroller 24 receives the protection signals of the signal sensing circuit 23, and outputs a logic control signal.

The control circuit 25 receives the logic control signal and controls the AC signal output from the inverter circuit 21 according to the logic control signal. In the exemplary embodiment, the signal sensing circuit 23 includes a temperature sensing circuit 230, a feedback circuit 231, a voltage sensing circuit 232 and a light sensing circuit 233.

In the exemplary embodiment, the protection signals include a voltage protection signal, a current protection signal, a temperature protection signal and a light protection signal.

In the signal sensing circuit 23, the temperature sensing circuit 230 is connected between the inverter circuit 21 and the microcontroller 24, and receives temperature signal from the inverter circuit 21. Then the temperature sensing circuit 230 generates a temperature voltage protection signal and sends it to the microcontroller 24.

The feedback circuit 231 is connected between the light source module 22 and the microcontroller 24, and receives a current signal from the light source module 22. Then the feedback circuit 231 generates a current protection signal, and sends it to the microcontroller 24.

The voltage sensing circuit 232 is connected between the transformer circuit 211 and the microcontroller 24, and receives a voltage signal applied to the light source module 22. Then the voltage sensing circuit 232 generates a voltage protection signal, and sends it to the microcontroller 24.

The light sensing circuit 233 is connected between the light source module 22 and the microcontroller 24, and receives a light signal sensed from the light source module 22. Then the light sensing circuit 233 generates a light protection signal, and sends it to the microcontroller 24.

Figure 2:
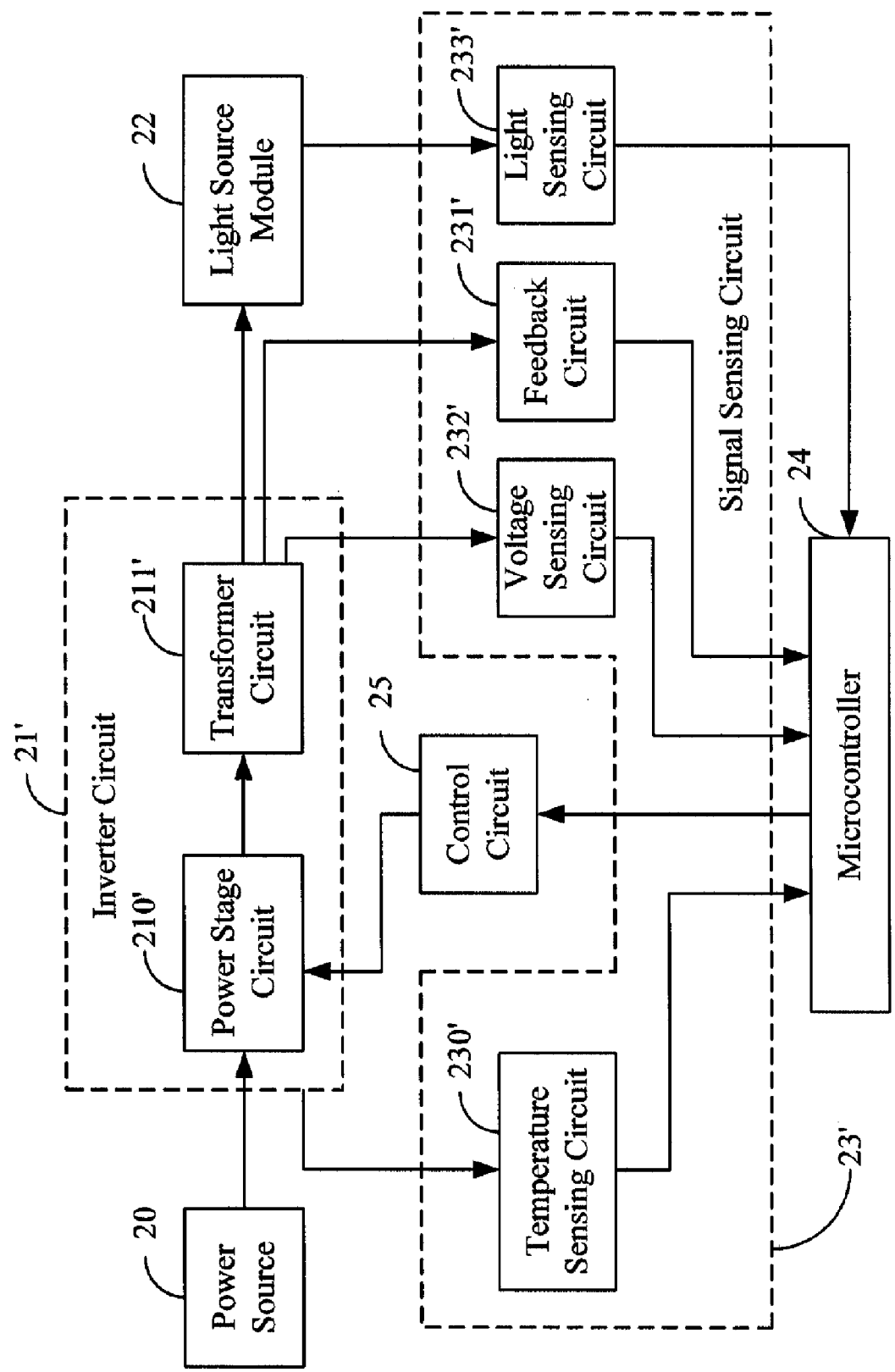
FIG. 2 is a block diagram of a driving device of a second exemplary embodiment of the present invention including the microcontroller of FIG. 1.

FIG. 2 is a block diagram of a driving device of a second exemplary embodiment of the present invention. The driving device is substantially the same as that of the driving device of FIG. 1, except that a feedback circuit 231' is connected between the transformer circuit 211' and the microcontroller 24, and receives a current signal of the light source module 22. Then the feedback circuit 231' generates a current protection signal, and sends it to the microcontroller 24. In the exemplary embodiment, the current signal is received from the transformer circuit 211'.

In a large LCD panel, a plurality of lamps are required for sufficient light intensity, and high voltages must be applied to two ends of each lamp. The present invention provides another embodiment as follows.

Figure 3:
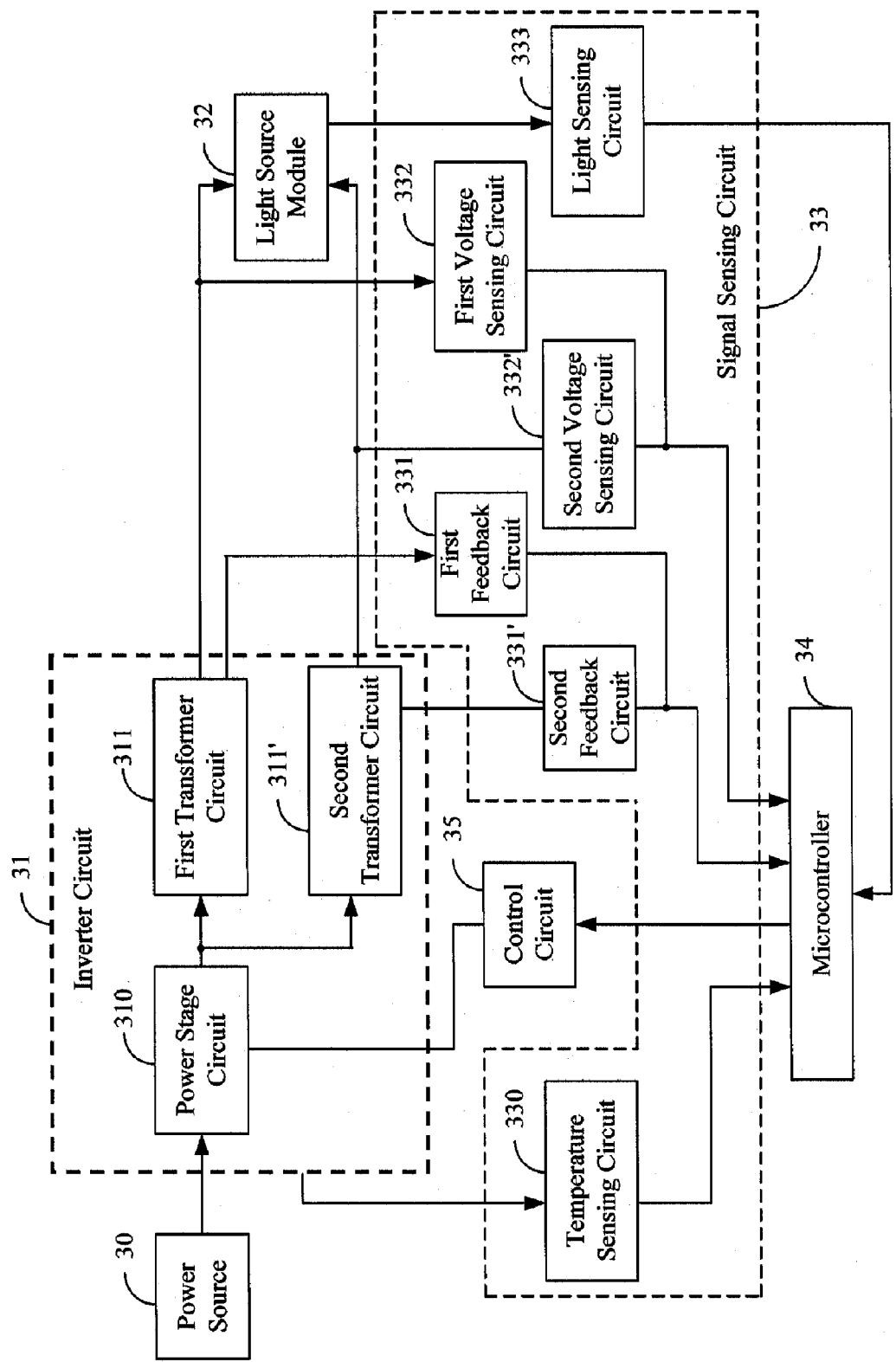
FIG. 3 is a block diagram of a driving device of a third exemplary embodiment of the present invention including the microcontroller of FIG. 1.

FIG. 3 is a block diagram of a driving device of a third exemplary embodiment of the present invention. The driving device is substantially the same as that of FIG. 2, except that an inverter circuit 31 includes a power stage circuit 310, a first transformer circuit 311, and a second transformer circuit 311'. A signal sensing circuit 33 includes a temperature sensing circuit 330, a first feedback circuit 331, a second feedback circuit 331', a first voltage sensing circuit 332, a second voltage sensing circuit 332' and a light sensing circuit 333.

In the exemplary embodiment, the power stage circuit 310 is respectively connected to inputs of the first transformer circuit 311 and the second transformer circuit 311'. The light source module 32 is connected between an output of the first transformer circuit 311 and an output end of the second transformer circuit 311'.

In the inverter circuit 31, the first feedback circuit 331 and the first voltage sensing circuit 332 are respectively connected between the first transformer circuit 311 and the microcontroller 24. The second feedback circuit 331' and the second voltage sensing circuit 332' are respectively connected to the second transformer circuit 311' and the microcontroller 24.

Figure 4:
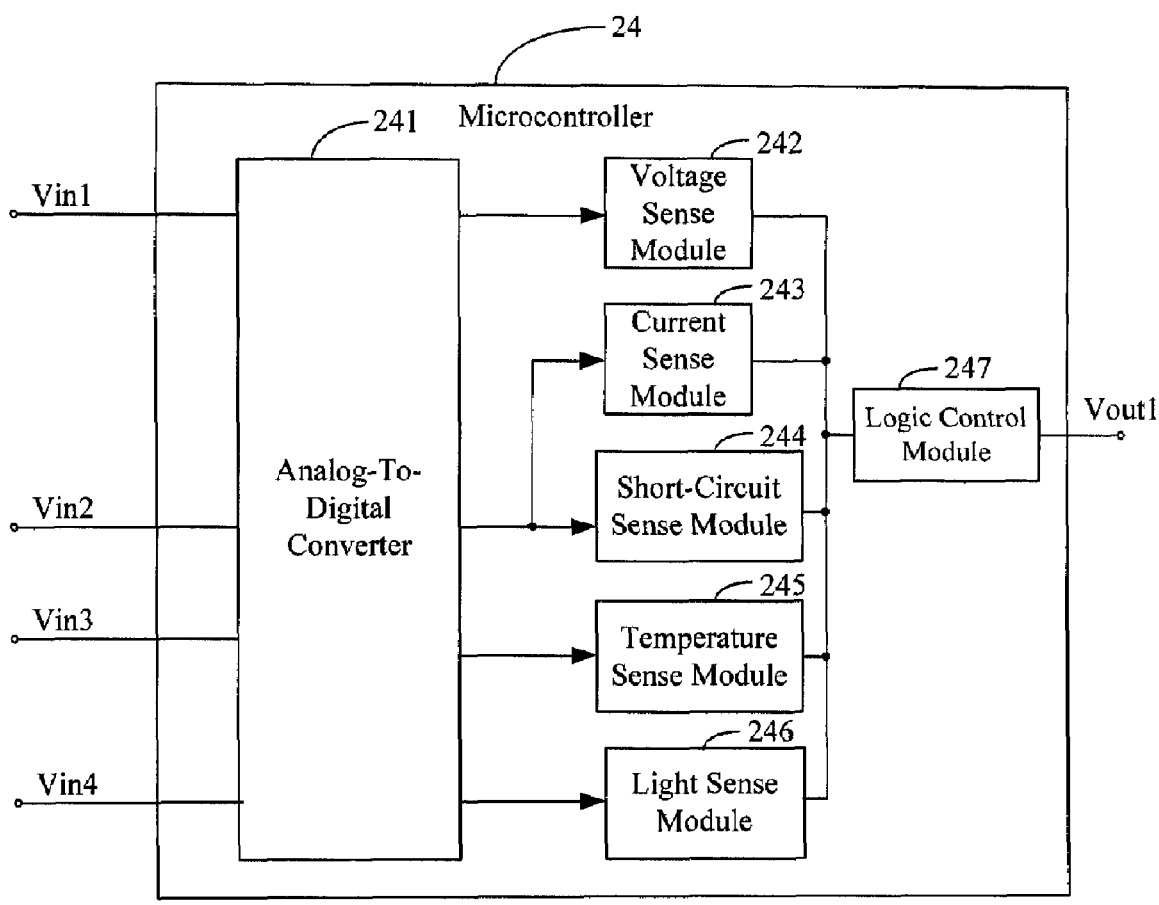
FIG. 4 is a block diagram of the microcontroller of FIG. 1.
Figure 5:
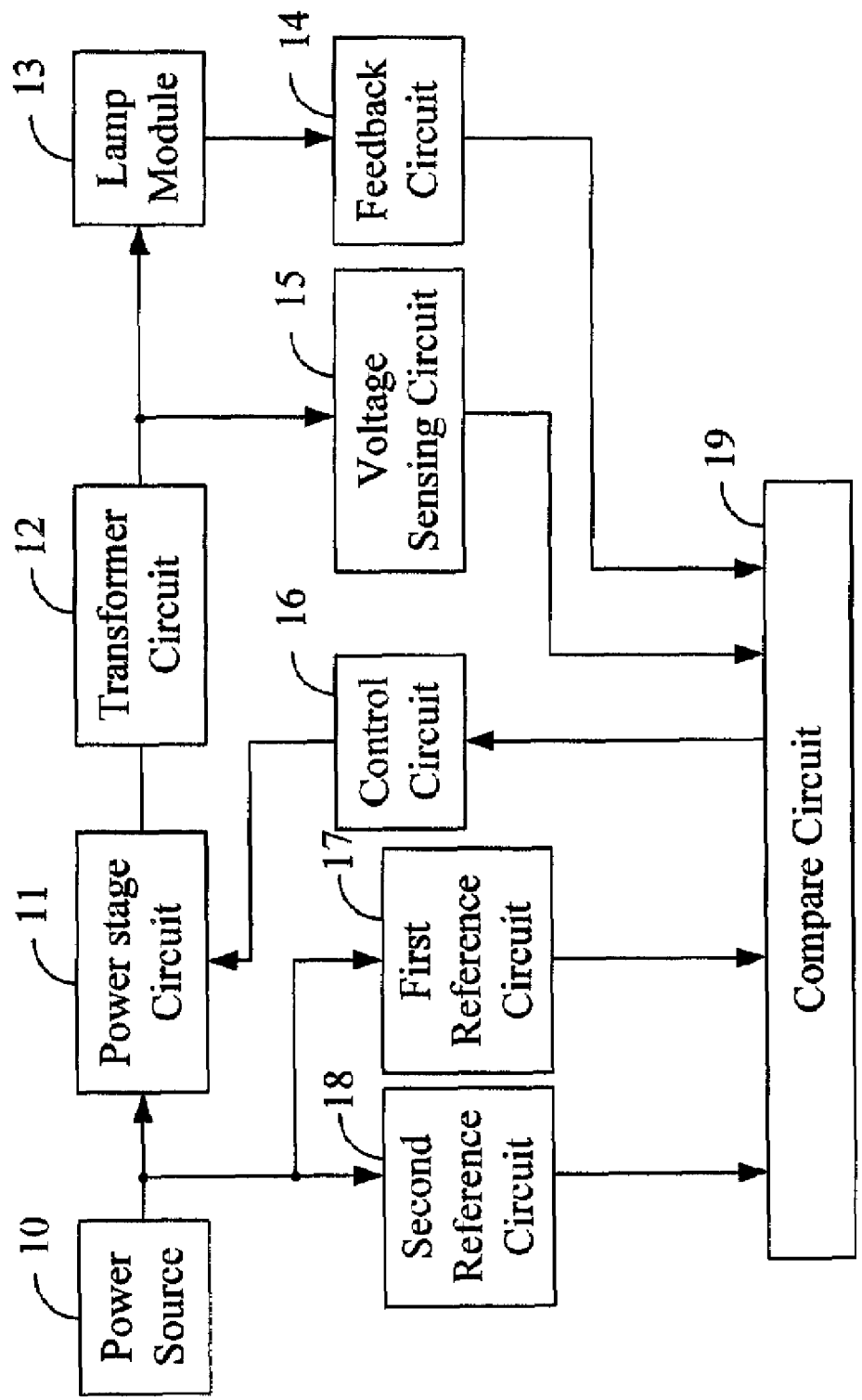
FIG. 5 is a block diagram of a conventional driving device.

FIG. 4 is a block diagram of the microcontroller 24 of the first three embodiments. The microcontroller 24 includes an analog-to-digital (A/D) converter 241, a voltage sense module 242, a current sense module 243, a short-circuit sense module 244, a temperature sense module 245, a light sense module 246 and a logic control module 247.

In the exemplary embodiment, the microcontroller 24 has four inputs, Vin1, Vin2, Vin3 and Vin4. The inputs respectively receive the voltage protection signal, the current protection signal, the temperature voltage protection signal, and the light protection signal. Before normal operation of the microcontroller 24, a voltage reference value corresponding to the voltage protection signal, a current reference value corresponding to the current protection signal, a temperature voltage reference value corresponding to the temperature voltage protection signal, and a light voltage reference value corresponding to the light voltage protection signal are predetermined in the microcontroller 24.

The voltage protection signal, the current protection signal, the temperature voltage protection signal, and the light voltage protection signal are analog signals that are converted to digital signals via the A/D converter 241.

The voltage sense module 242 compares the digital voltage protection signal to the voltage reference value, and determine whether voltages applied to the light source module 22 are over or under the voltage reference value. If the voltages applied to the light source module 22 are normal, the voltage sense module 242 ouptuts a logic high level 1. If the voltages applied to the light source module 22 are abnormal, the voltage sense module 242 outputs a logic low level 0.

Both the current sense module 243 and the short-circuit sense module 244 respectively compare the digital current protection signal to the individual current reference value to determine whether current flowing through the light source module 22 is over or under the current reference value. If the current flowing through the light source module 22 is normal, the current sense module 243 and the short-circuit sense module 244 respectively output a logic high level 1. If the current flowing through the light source module 22 is abnormal, the current sense module 243 and the short-circuit sense module 244 respectively output a logic low level 0.

The temperature sense module 245 compares the digital temperature voltage signal to the temperature voltage reference to determine whether temperature of the light source module 22 or the driving device is normal. If the temperature of the light source module 22 or the driving device is normal, the temperature sense module 245 outputs a logic high level 1. If the temperature of the light source module 22 or the driving device is abnormal, the temperature sense module 245 outputs a logic low level 0.

The light sense module 246 compares the digital light protection signal to the light voltage reference value, and determines whether light of the light source module 22 is over the light voltage reference. That is, the light sense module 246 determines whether the light source module 22 is abnormal, such as: short-circuit, aging, which can lead the light of the light source module 22 over the light voltage reference. If the light source module 22 is normal, the light sense module 246 outputs a logic high level 1. If the light source module 22 is abnormal, the light sense module 246 outputs a logic low level 0.

If the voltage protection signal, the current protection signal, the temperature voltage protection signal, and the light protection signal are normal, the microcontroller 24 detects the protection signals again. If one of the voltage protection signal, the current protection signal, the temperature voltage protection signal and the light protection signal is abnormal, the microcontroller 24 outputs the logic control signal Vout1. In the exemplary embodiment, the logic control signal Vout1 can be a latch signal, or an auto-restart signal. In addition, the logic control module 247 is designed based on requirements of customers; for example, if the light source module 22 is over-voltage, the logic control module 247 can output a latch signal or an auto-restart signal.

If the microcontroller 24 outputs the latch signal, the control circuit 25 cuts off the AC signal of the power stage circuit 210 to stop operation of the driving device. If the microcontroller 24 outputs the auto-restart signal, the control circuit 25 restarts the driving device and ensures stability of operation of the driving device.

In the present invention, voltage protection, current protection, temperature protection, and light protection functions are integrated into the microcontroller 24, which simplifies the structure of peripheral circuits. In addition, the protection functions are performed by digital circuits in the microcontroller 24, and thus, reference values of protection signals have high precision.

While embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A driving device for driving a plurality of Cold Cathode Fluorescent Lamps (CCFLs), comprising:
   an inverter circuit for converting a received power signal to an alternating current (AC) signal;
   a signal sensing circuit connected to the inverter circuit and the CCFLs, for generating protection signals of the driving device, wherein the protection signals comprise a current protection signal;
   a microcontroller for receiving the protection signals output from the signal sensing circuit, and outputting a logic control signal, the microcontroller comprising:
      an analog-to-digital (A/D) converter for converting the current protection signal to a digital current protection signal;
      a short-circuit sense module for receiving the digital current protection signal, and detecting whether the CCFLs have a short-circuit based on the digital current protection signal; and
      a logic control module for receiving output of the short-circuit sense module and outputting the logic control signal; and
   a control circuit for receiving the logic control signal and controlling the AC signal output from the inverter circuit according to the logic control signal.

2. The driving device as claimed in claim 1, further comprising a power source for providing the power signal.

3. The driving device as claimed in claim 2, wherein the inverter circuit comprises:
   a power stage circuit connected to the power source; and
   a transformer circuit connected to the power stage circuit, for converting a signal output from the power stage circuit to the AC signal.

4. The driving device as claimed in claim 1, wherein the protection signals further comprise a temperature protection signal, a voltage protection signal, and a light protection signal.

5. The driving device as claimed in claim 4, wherein the microcontroller comprises:
   a voltage sense module for receiving the digital voltage protection signal, and detecting whether voltages of the CCFLs are normal;
   a current sense module for receiving the digital current protection signal, and detecting whether current flowing through the CCFLs is normal;
   a temperature sense module for receiving the digital temperature protection signal, and detecting whether a temperature of the driving device is normal; and
   a light sense module for receiving the digital light protection signal, and detecting whether light of the CCFLs is normal;
   wherein the A/D converter is for converting all the received protection signals to digital protection signals; and the logic control module is further for receiving outputs of the voltage sense module, the current sense module, the temperature sense module, and the light sense module.

6. The driving device as claimed in claim 4, wherein the signal sensing circuit comprises:
   a feedback circuit connected between the CCFLs and the microcontroller, for generating and sending the current protection signal to the microcontroller;
   a voltage sensing circuit connected between the inverter circuit and the microcontroller, for generating and sending the voltage protection signal to the microcontroller;
   a temperature sensing circuit connected between the inverter circuit and the microcontroller, for generating and sending the temperature protection signal to the microcontroller; and
   a light sensing circuit connected between the CCFLs and the microcontroller, for generating and sending the light protection signal to the microcontroller.

7. An assembly comprising:
   a light source module illuminating under high-voltage powering;
   a power source enabling illuminating of said light source module by means of providing said high-voltage powering;
   an inverter circuit electrically connectable between said light source module and said power source, and converting high-voltage power signals received from said power source to alternating current (AC) signals for outputting to said light source module to enable said illuminating of said light source module;
   a signal sensing circuit selectively electrically connectable with said inverter circuit and said light source module for generating AC protection signals based on said output AC signals to said light source module and a working status of said inverter circuit, wherein said AC protection signals comprise current protection signals;
   a microcontroller electrically connectable with said signal sensing circuit for receiving said AC protection signals from said signal sensing circuit, and outputting logic control signals based on digital signals converted from said AC protection signals, said microcontroller comprising;
      an analog-to-digital (A/D) converter for converting the current protection signals to digital current protection signals;
      a short-circuit sense module for receiving the digital current protection signals, and detecting whether said light source module has a short-circuit based on the digital current protection signals; and
      a logic control module for receiving output of the short-circuit sense module, and outputting said logic control signals; and
   a control circuit electrically connectable between said microcontroller and said inverter circuit for controlling said AC signals output from said inverter circuit to said light source module according to said logic control signals.

8. The assembly as claimed in claim 7, wherein said AC protection signals further comprise a selective one of temperature protection signals, light protection signals, and voltage protection signals.

9. The assembly as claimed in claim 8, wherein said microcontroller comprises:

a voltage sense module for receiving the voltage protection signals after conversion, and detecting whether the voltages of said light source module are normal;

a current sense module for receiving the current protection signals after conversion, and detecting whether current flowing through said light source module is normal;

a temperature sense module for receiving the temperature protection signals after conversion, and detecting whether a temperature of the assembly is normal; and a light sense module for receiving the light protection signals after conversion, and detecting whether light of said light source module is normal;

wherein the A/D converter is for converting all said AC protection signals to digital protection signals; and said logic control module is further for receiving outputs of the voltage sense module, the current sense module, the temperature sense module, and the light sense module.

* * * * *